United States Patent
Alagappan

(10) Patent No.: US 10,423,701 B1
(45) Date of Patent: Sep. 24, 2019

(54) WEB ASSET MODIFICATION

(71) Applicant: Trilibis, Inc., San Mateo, CA (US)

(72) Inventor: Meyyappan Alagappan, Sunnyvale, CA (US)

( * ) Notice: Subject to any disclaimer, the term of this patent is extended or adjusted under 35 U.S.C. 154(b) by 264 days.

(21) Appl. No.: 13/713,194

(22) Filed: Dec. 13, 2012

(51) Int. Cl.
*G06Q 30/02* (2012.01)
*G06F 17/21* (2006.01)

(52) U.S. Cl.
CPC ................ *G06F 17/218* (2013.01)

(58) Field of Classification Search
CPC .......... G06F 15/16; G06F 17/21; G06F 17/24; G06F 17/30; G06Q 10/10; G06Q 50/00; H04N 21/242; H04N 21/4302; H04N 21/439; H04N 21/8133; H04N 21/8106
USPC ............. 715/234; 705/14; 348/468; 709/203
See application file for complete search history.

(56) References Cited

U.S. PATENT DOCUMENTS

| | | | | |
|---|---|---|---|---|
| 8,781,105 B1* | 7/2014 | Duva | ................ | G06Q 30/0246 379/201.01 |
| 8,904,021 B2* | 12/2014 | Harrison | ................ | H04L 12/189 709/229 |
| 2002/0087660 A1* | 7/2002 | Martin | .............. | G06F 17/30861 709/218 |
| 2007/0162953 A1* | 7/2007 | Bolliger | ............ | G06F 17/30056 725/142 |
| 2009/0043657 A1* | 2/2009 | Swift et al. | ...................... | 705/14 |
| 2011/0252071 A1* | 10/2011 | Cidon | ................ | G06F 17/30174 707/802 |
| 2012/0202428 A1* | 8/2012 | Mirbaha et al. | .............. | 455/41.2 |
| 2012/0236201 A1* | 9/2012 | Larsen et al. | .................. | 348/468 |
| 2013/0036351 A1* | 2/2013 | King | .................. | G06F 17/30893 715/234 |
| 2014/0047386 A1* | 2/2014 | Lynch | ................... | G06F 3/0482 715/810 |

OTHER PUBLICATIONS

Apple iPhone 3GS—Technical Specifications, released Jul. 2010 http://support.apple.com/kb/sp565.*
Apple iPhone 4S—Technical Specifications, released Oct. 12, 2011, https://www.apple.com/lae/iphone-4s/specs/.*
Apple iPhone_iOS3.1_User_Guide.pdf, released 2009, http://manuals.info.apple.com/MANUALS/0/MA616/en_US/iPhone_iOS3.1_User_Guide.pdf.*
Apple iPhone_iOS4.2_and_4.3_User_Guide.pdf, released 2011, http://manuals.info.apple.com/MANUALS/1000/MA1539/en_US/iPhone_iOS4_User_Guide.pdf.*
"HTML DOM Hidden Object", captured by www.archived.org at www.w3school.com, on Oct. 6, 2012.*

* cited by examiner

*Primary Examiner* — Justin S Lee

(57) ABSTRACT

A system for web asset modification comprises a processor and a memory. The processor is configured to: receive a request for a web asset for display on a device; determine one or more groups for the web asset, wherein each of the one or more groups comprises a group for adapting display of the web asset on the device; and modify the web asset based at least in part on one group of the one or more groups. The memory is coupled to the processor and is configured to provide the processor with instructions.

29 Claims, 12 Drawing Sheets

US 10,423,701 B1

WEB ASSET MODIFICATION

BACKGROUND OF THE INVENTION

Web assets are requested by a variety of devices with different characteristics and with different configurations —for example, these characteristics include the screen size and/or resolution, the browser, the player software, etc. A customized web asset can be delivered for each different device and configuration. However, this is difficult to maintain because of the ever evolving number of different assets that must be kept up to date.

BRIEF DESCRIPTION OF THE DRAWINGS

Various embodiments of the invention are disclosed in the following detailed description and the accompanying drawings.

DETAILED DESCRIPTION

Figure 1:
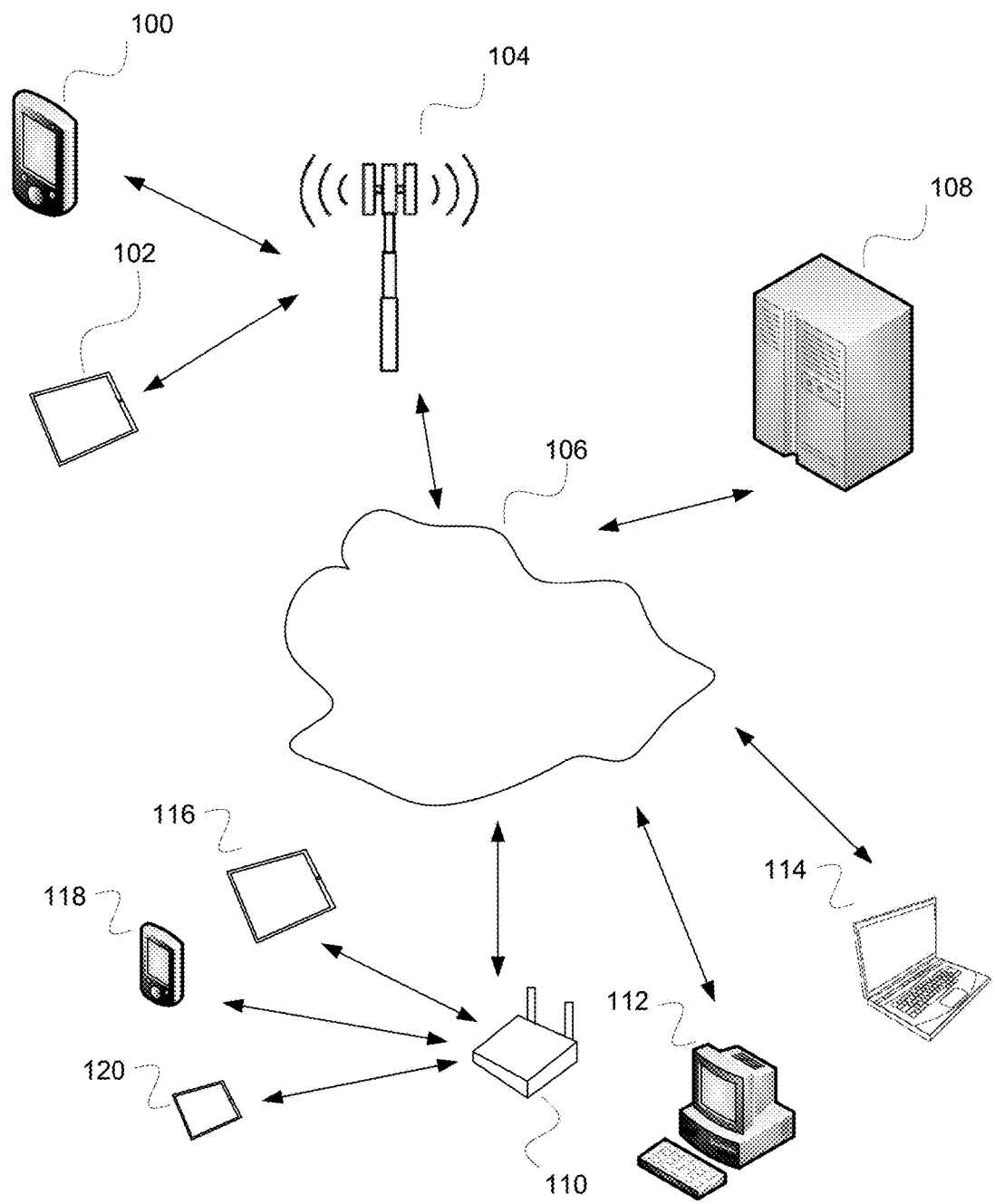
FIG. 1 is a diagram illustrating an embodiment of a system for web asset modification.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for web asset modification is disclosed. The system comprises a processor and a memory. The processor is configured to: receive a request for a web asset for display on a device; determine one or more groups for the web asset, wherein each of the one or more groups comprises a group for adapting display of the web asset on the device; and modify the web asset based at least in part on one group of the one or more groups. The memory is coupled to the processor and is configured to provide the processor with instructions.

In some embodiments, a system for providing web assets (e.g., a web page) to a device with a specific configuration includes determining a grouping associated with the request for the web asset. Based on the grouping, the web asset is modified according to custom instructions embedded in the web asset (e.g., an Hyper Text Markup Language (HTML) element that enables customization, a JavaScript™ element that enables customization, a cascading style sheet (CSS) element that enables customization, etc.). The modification of the web asset include the adding of group-specific steps, the hiding or removing of group-specific steps, and the changing of group-specific steps that are executed by the device to display the web asset. For example, the web asset includes custom instructions to display a full table of information for a laptop screen with a blue background, and only an abbreviated table for a portable phone screen with a white background. The custom instructions are used to modify the web asset so that the laptop screen and the portable phone receive different web asset (e.g., HTML instructions, JavaScript instructions, CSS instructions, etc.) file that enable the customizations. In some embodiments, the web asset custom instructions preserve web asset functionality (e.g., do not break the web asset code, can run or be executed or interpreted with the custom instructions embedded, etc.).

FIG. 1 is a diagram illustrating an embodiment of a system for web asset modification. In the example shown, a user of a device (e.g., phone 100, phone 118, tablet 102, tablet 116, mini tablet 120, desktop 112, laptop 114, etc.) requests a web asset via network 106 (e.g., a wireless network, a wired network, a cellular network, etc.). For example, network 106 communicates with phone 100 and tablet 102 via cellular infrastructure (e.g., cell tower 104) or via a wireless infrastructure (e.g., wireless router 110). The web asset request is serviced by server 108. In order to adapt the requested web asset to the device with its software and hardware environment, server 108 determines the software and hardware environment associated with the request. For example, a specific device identifier enables classification of the device, and its screen resolution and its size (e.g., iPhone 3GS with it associated 3.5 inch screen with 320×480 pixels). And for example, a browser identifier enables classification of a software environment (e.g., chrome browser). Once the hardware and software environment is determined, a preprocessor indicates a customization (e.g., a customization grouping, a customization identifier, etc.). The request is forwarded to a backend server, which provides the web asset in its generalized form (e.g., an HTML page). The generalized form of the web asset is then post-processed using the indicated customization. The post-processing of the generalized form of the web asset interprets customized, but native language acceptable, codes (e.g., attributes, tags, etc.) to modify, remove, or add to the web asset.

Figure 2:
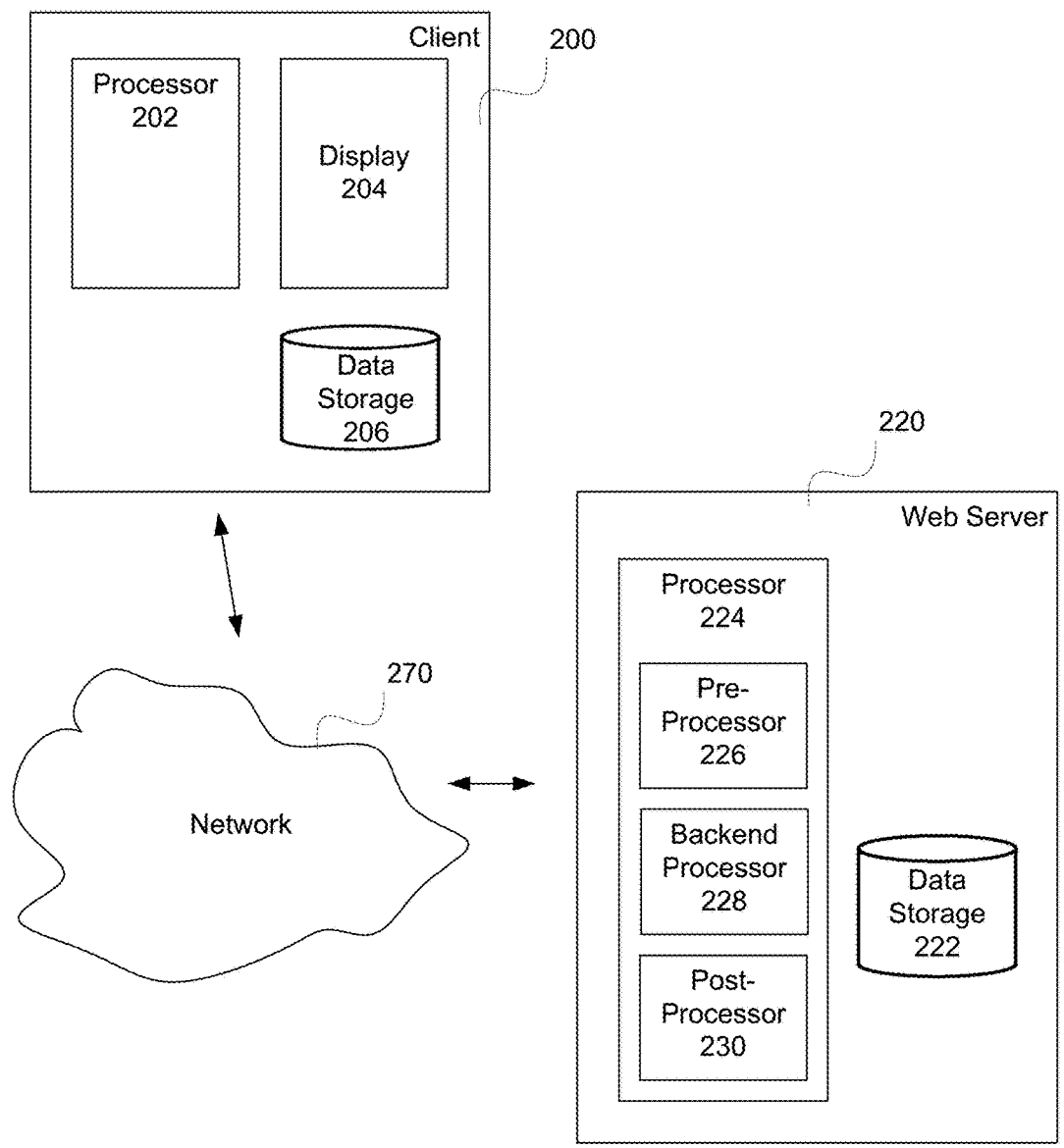
FIG. 2 is a block diagram illustrating an embodiment of a system for web asset modification.

FIG. 2 is a block diagram illustrating an embodiment of a system for web asset modification. In the example shown, client 200 comprises processor 202, display 204, and data storage 206. A user of client 200 requests a web asset—for example, a user indicates by clicking in a browser (e.g., running using processor 202 of client 200) on a link displayed on display 204. The indication causes a request to be sent to web server 220 via network 270 to retrieve a web asset associated with the link associated with the request. Network 270 represents a set of wireless and/or wired communication networks (e.g., including routers, servers, data storage units, processors, connectivity infrastructure, etc.) that enable the request and the subsequent response to the request to be conveyed between client 200 and web server 220 that responds to the request. In various embodiments, the indication comprises one or more of the following: a typed in web address, a request for retrieval of a web asset initiated by code running on the browser (e.g., an ad retrieval), a clicking of a link, a search for a web site, an application running on a device requesting a web asset, or any other appropriate indication. Web server 220 comprises processor 204 and data storage 222. Processor 204 includes software or hardware modules performing pre-processor 226 functionality, backend processor 228 functionality, and post-processor 230 functionality. Pre-processor 226 functionality includes receiving a request for a web asset and determining one or more associated groups that has similar web asset requirements (e.g., the group(s) will all get the same web page portrayal). Backend processor 228 functionality comprises exiting web asset retrieval based on a received request (e.g., current technology solution for web page request fulfillment). Post-processor 230 functionality includes receiving the retrieved web asset from backend processor 228 and processing the web asset based at least in part on the determined group(s). Post-processor 230 adds to, modifies, or removes web asset elements based on embedded instructions that are compatible with the regular web asset elements. The web asset is stored on data storage 222 of web server 220 both prior to post processing (e.g., as retrieved using backend processor 228), during post-processing, and just prior to providing to the requestor. Web asset as modified by post-processor 230 is then provided to client 200 via network 270 and stored on data storage 206. Web asset as stored in data storage 206 is displayed for the user using display 204 and processor 202.

Figure 3:
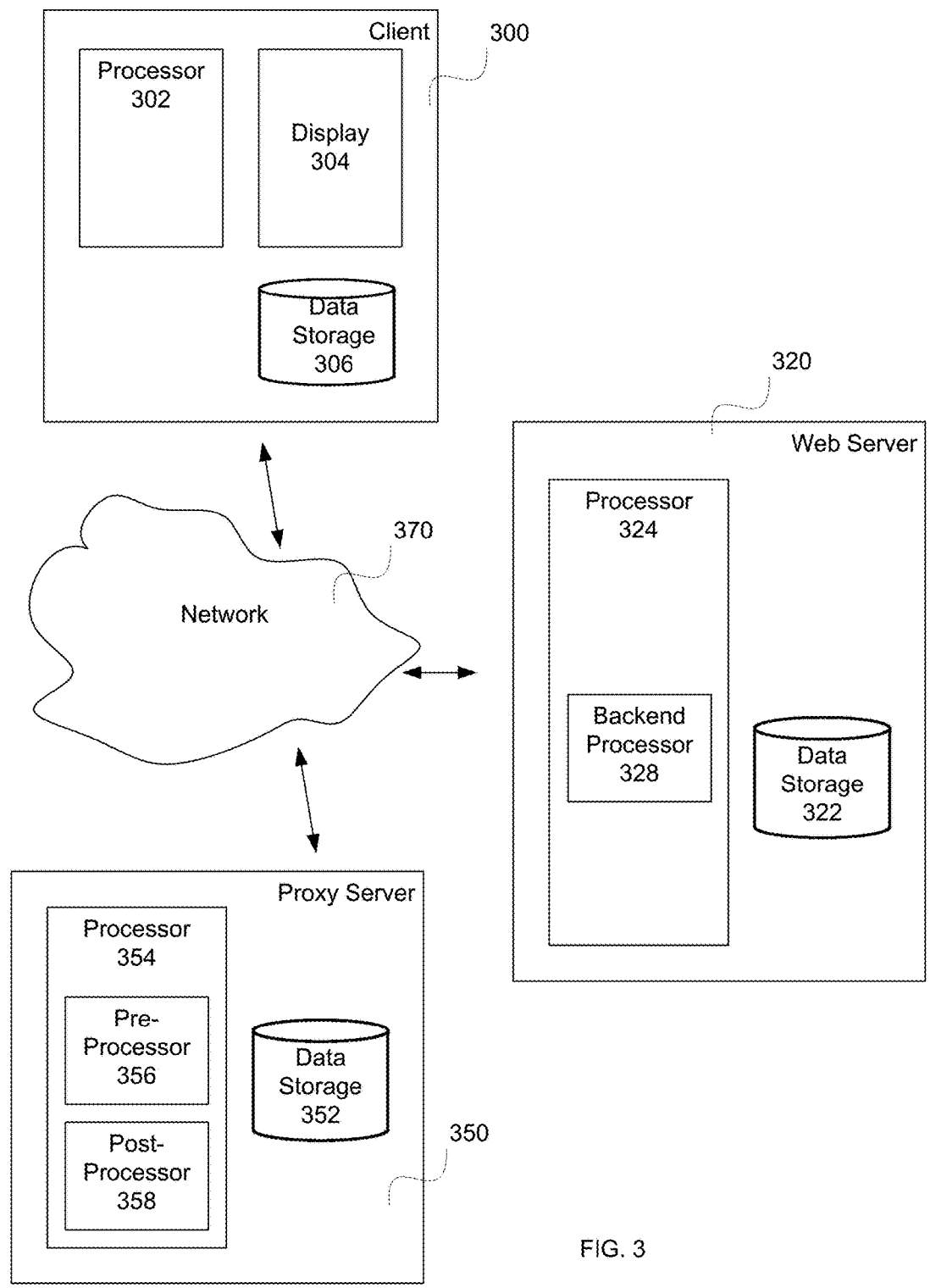
FIG. 3 is a block diagram illustrating an embodiment of a system for web asset modification.

FIG. 3 is a block diagram illustrating an embodiment of a system for web asset modification. In the example shown, client 300 comprises processor 302, display 304, and data storage 306. In various embodiments, data storage 306 comprises one or more of the following: a solid state memory (e.g., a random access memory, a chip memory, etc.), a magnetic memory (e.g., a hard disk, a magnetic disk, a tape, a magnetic random access memory, etc.), or any other appropriate memory. A user of client 300 requests a web asset—for example, a user indicates by clicking in a browser (e.g., running using processor 302 of client 300) on a link displayed on display 304. The indication causes a request to be sent to web server 320 via network 370 and via proxy server 350 to retrieve a web asset associated with the link associated with the request. Network 370 represents a set of wireless and/or wired communication networks (e.g., including routers, servers, data storage units, processors, connectivity infrastructure, etc.) that enable the request and the subsequent response to the request to be conveyed between client 300 and web server 320 and proxy server 350 that both respond to the request. In various embodiments, the indication comprises one or more of the following: a typed in web address, a request for retrieval of a web asset initiated by code running on the browser (e.g., an ad retrieval), a clicking of a link, a search for a web site, an application running on a device requesting a web asset, or any other appropriate indication. Web server 320 comprises processor 324 and data storage 322. Processor 324 includes software or hardware modules performing backend processor 328 functionality. Proxy server 350 comprises processor 354 and data storage 352. In various embodiments, data storage 352 comprises one or more of the following: a solid state memory (e.g., a random access memory, a chip memory, etc.), a magnetic memory (e.g., a hard disk, a magnetic disk, a tape, a magnetic random access memory, etc.), or any other appropriate memory. Processor 354 includes software or hardware modules performing pre-processing 356 functionality and post-processor 358 functionality. Pre-processor 356 functionality includes receiving a request for a web asset and determining one or more associated groups that has similar web asset requirements (e.g., the group(s) will all get the same web page portrayal). Backend processor 328 functionality comprises exiting web asset retrieval based on a received request (e.g., current technology solution for web page request fulfillment). Post-processor 358 functionality includes receiving the retrieved web asset from backend processor 328 and processing the web asset based at least in part on the determined group(s). Post-processor 358 adds to, modifies, or removes web asset elements based on embedded instructions that are compatible with the regular web asset elements. The web asset is stored on data storage 322 of web server 320 prior to post-processing (e.g., as retrieved using backend processor 328). The web asset is stored on data storage 352 during post-processing and just prior to providing to the requestor. Web asset as modified by post-processor 354 is then provided to client 300 via network 370 and stored on data storage 306. In some embodiments, data storage 306 comprises a temporary memory used for temporary storage of data. Web asset as stored in data storage 306 is displayed for the user using display 304 and processor 302.

Figure 4:
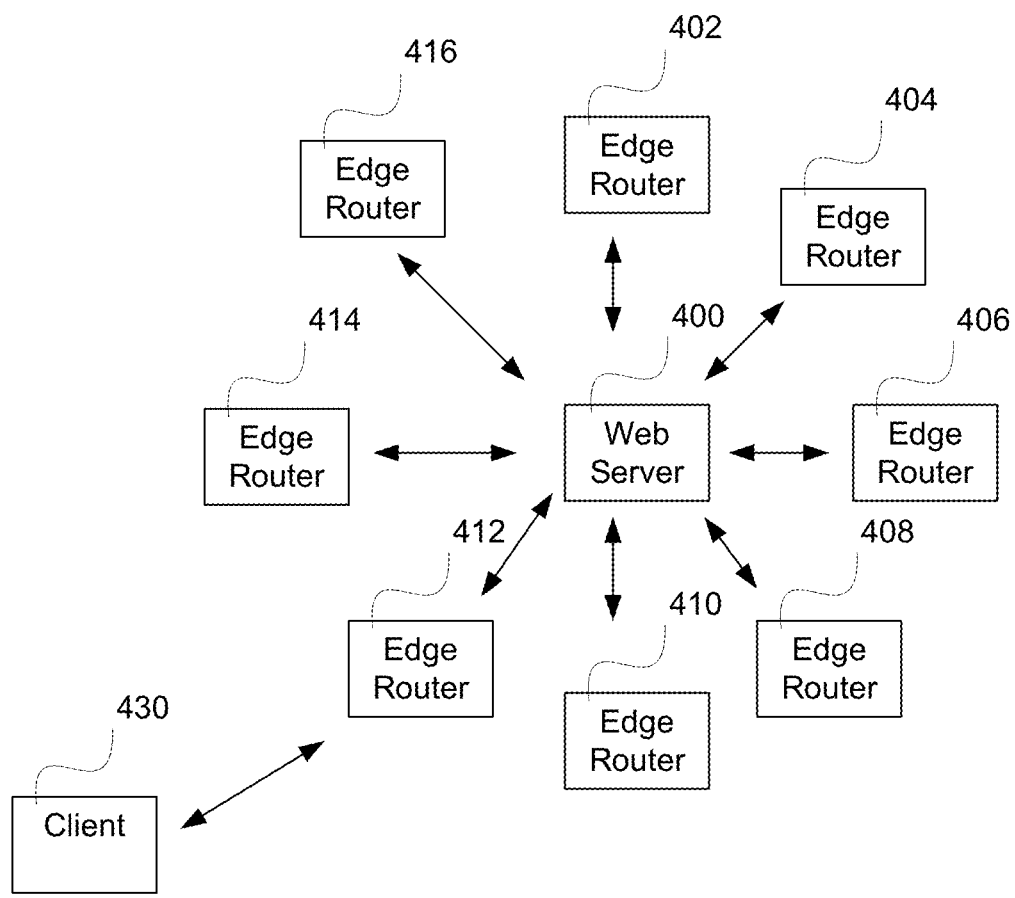
FIG. 4 is a block diagram illustrating an embodiment of a system for web asset modification.

FIG. 4 is a block diagram illustrating an embodiment of a system for web asset modification. In the example shown, client 430 requests a web asset from web server 400 via an edge router (e.g., edge router 402, edge router 404, edge router 406, edge router 408, edge router 410, edge router 412, edge router 414, and edge router 416). Web server 400 includes backend processing that stores and retrieves the web asset so that it can be provided to the user in response to the request. Pre-processing to determine a grouping for modification and post-processing based at least in part on the grouping is performed in an edge router.

Figure 5:
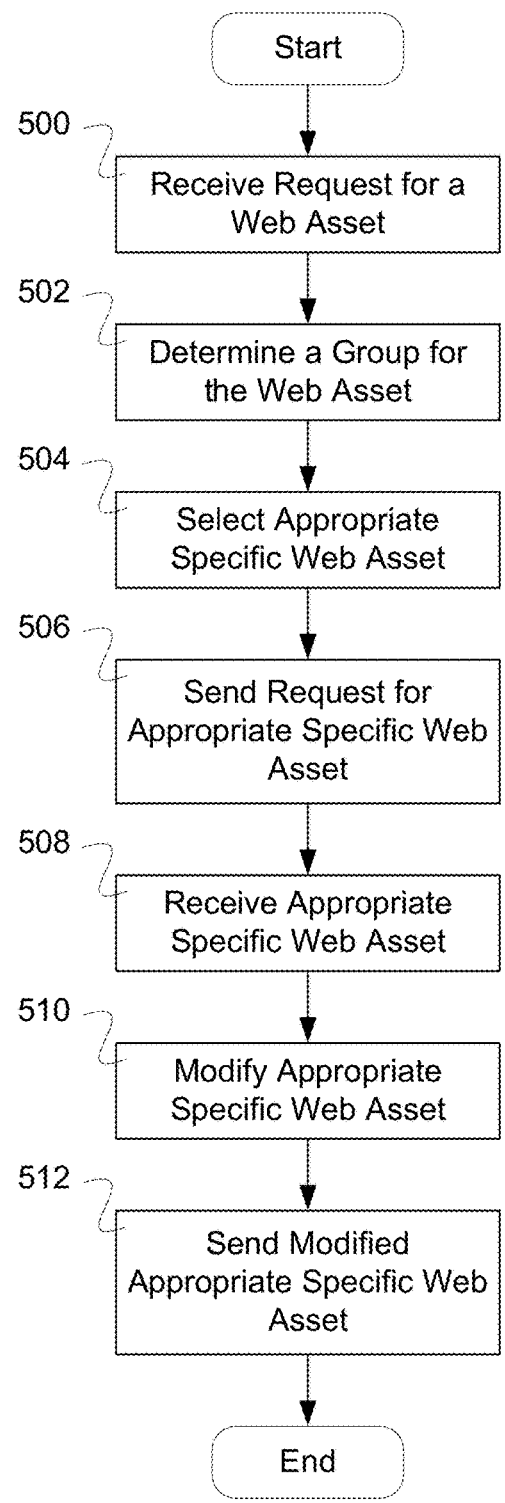
FIG. 5 is a flow diagram illustrating an embodiment of a process for modifying a web asset.

FIG. 5 is a flow diagram illustrating an embodiment of a process for modifying a web asset. In the example shown, in 500 a request is received for a web asset. For example, a pre-processor module receives a request from a device requesting a web asset (e.g., a web page). In 502, one or more groups for the web asset is determined. For example, based on associated information in the web asset request one or more groups is/are determined (e.g., a grouping that will receive the same web asset information to display and that is adapted for display on the device as appropriate for its hardware and software environment). In 504, an appropriate specific web asset is selected. For example, based on the grouping web asset is selected to be retrieved from a server (e.g., a backend server). In some embodiments, a grouping determines whether a web asset that includes flash or does not include flash is selected. In 506, a request for the appropriate specific web asset is sent. For example, a pre-processing module sends a request for a web asset to a backend server. In 508, the appropriate specific web asset is received. In 510, the appropriate specific web asset is modified. For example, the syntax of the web asset is analyzed to locate embedded customization instructions. These instructions then are used to add to, to modify, or to remove web asset elements. In 512, the modified appropriate specific web asset is sent. For example, once the web asset has been customized, it is sent to the requestor.

Figure 6:
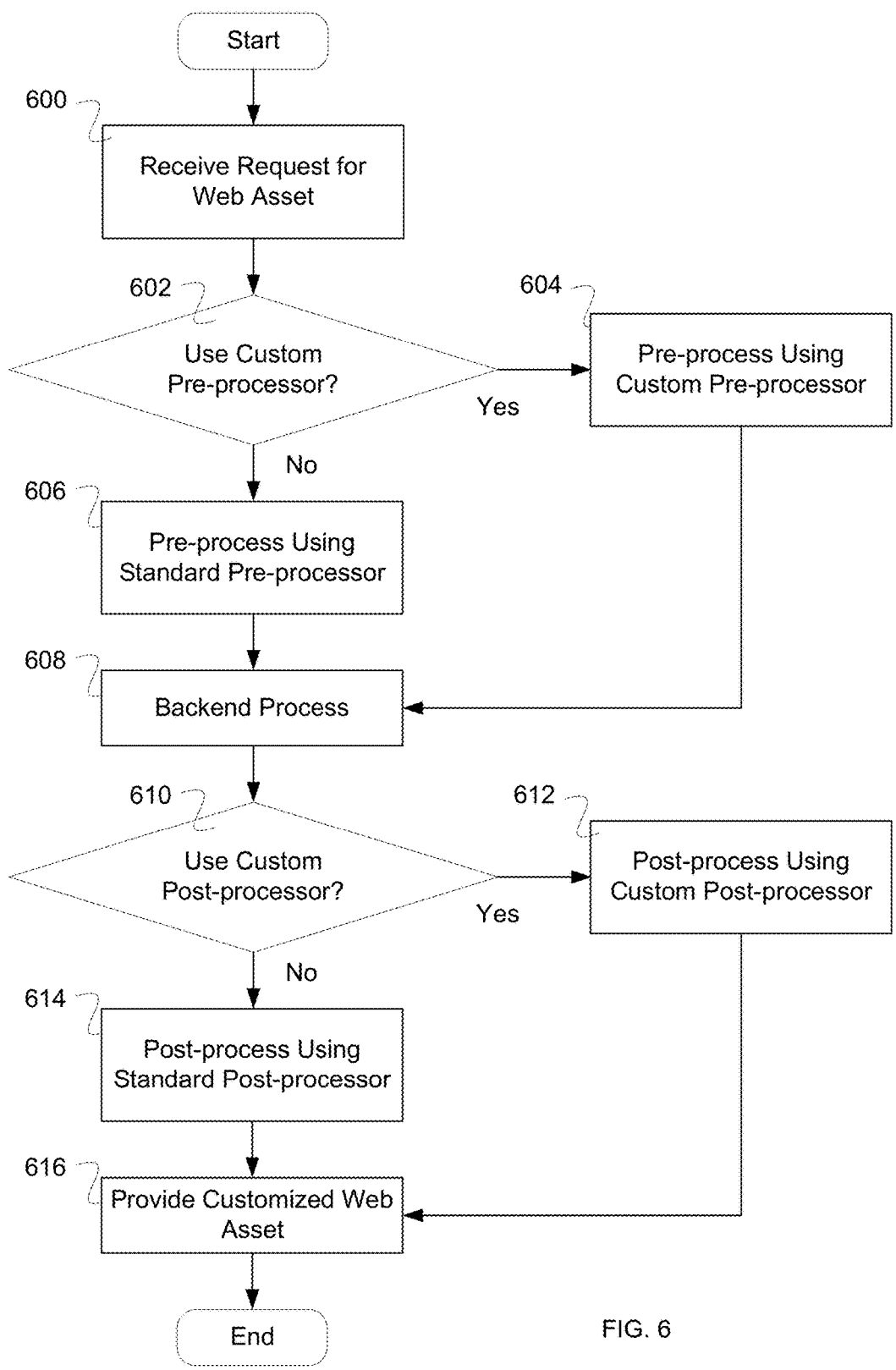
FIG. 6 is a flow diagram illustrating an embodiment of a process for web asset modification.

FIG. 6 is a flow diagram illustrating an embodiment of a process for web asset modification. In the example shown, in 600 a request is received for a web asset. For example, a user using a device (e.g., a mobile device) hits the server for a web page. In 602, it is determined whether to use a custom pre-processor. In the event that a custom pre-processor is to be used, then in 604 pre-processing using a custom pre-processor is performed, and control passes to 608. In the event that a custom pre-processor is not to be used, then in 606 pre-processing using a standard pre-processor is performed, and control passes to 608. In some embodiments, pre-processing includes finding one or more groups, storing the one or more groups value(s) in a memory, and requesting/receiving the appropriate web asset. In 608, backend processing is performed. For example, backend processing includes receiving a request to provide an appropriate web asset and providing the web asset (e.g., a request for a web page and providing the web page). In 610, it is determined whether a custom post-process is to be used. In the event that a custom post-process is to be used, then in 612 post-processing using a custom post-processor is performed, and control passes to 616. In the event that a custom process is not to be used, then in 614 a standard post-processing using a post-processor is performed, and control passes to 616. In some embodiments, post-processing includes modifying web assets according to rules provided in the web asset as interpreted by the post-processor. In 616, a customized web asset is provided. For example, a web asset that has been modified is provided to the requestor of the web asset (e.g., an optimized web page for a mobile device).

A system for web asset modification is disclosed. Web asset modification provides an efficient way to address the complexity presented by the diverse means of internet access today. The system engine integrates with any Java server and allows content creators to efficiently manipulate content without having to delve into the complexity of the mobile landscape. Web asset modification instructions are embedded into a web asset (e.g., HTML, CSS, etc.), which is parsed by the system engine and rendered according to the device requesting the page. At the core of the system engine is the concept of groups. A group is used to target a set of devices and is either selected from a pre-defined list (e.g., a predefined group) or is defined according to the needs of a developer (e.g., as defined using a group syntax), using a broad range of device attributes. Logical operators further extend flexibility in defining groups enabling customization of web assets.

In some embodiments, web asset modification for HTML type assets includes attribute overwriting. For example, rules to overwrite HTML attributes have the syntax form of tg-groupname-attribute=value. A sample rule which overwrites a green background color to blue for safari browser or touch-enabled phones is as follows: <div style="background-color: green" tg-safari,touchphone-style="background-color: blue; margin:−2px"; />. Note that multiple groups can be separated by comma(s) without any restrictions—for example, a group is a combination of custom group(s) and pre-defined group(s). As another example, rules to show and hide HTML attributes have the form of: tg-groupname-$action=value, where the value is "hide" or "show". In another example, a div which is only to be shown to devices that fall into mygroup1 or touchphone is represented as <div tg-mygroup1,touchphone-$action="show"/>.

In some embodiments, web asset modification for JavaScript type assets includes overwriting, showing and hiding. For example, rules to show and hide JavaScript snippets within the code have the form of <script tg-groupname-$action=value/>, where value is "hide" or "show". For another example, the snippet below will only be displayed on iPhone devices (devicetype=phone AND os=iOS). Note the use of '+' for an AND operation.

<script tg-ios+phone-$action="show">
alert("This is an iPhone!");
</script>

In some embodiments, web asset modification for CSS type assets includes attribute overwriting. For example, rules within the CSS code result in the CSS being selectively rendered according to the device requesting the page. CSS rules are similar to HTML rules. The CSS syntax has the form: tg-groupname-attribute:value. In the example below, the float: left property is overridden for devices from group iphone:

```
#mydivId
{
    float: left;
    tg-iphone-float:right;
}
```

In some embodiments, rules are used to manipulate link tags: <link rel="stylesheet" href="small.css" tg-iphone-href="big.css" tg-blackberry-$action="hide"/>. In the example, big.css is used for iPhone devices, a link is hidden for BlackBerry devices, and small.css is used for all other devices. In another example, CSS rules are used to hide and show style tags. This is useful for limiting the CSS that is sent to a certain category of devices. For example,
<style tg-iphone-$action="hide" type="text/css">
id1
{
    color: blue;
    font-size: 12px;
}
</style>

In some embodiments, web asset modifications use groups to target experiences and functionality to defined sets of users (e.g., iPhone users, Tablet users, etc.). The framework allows users to use:

Pre-defined groups: These are provided by the framework to quickly target commonly used device categories. Pre-defined groups are directly used within the HTML or CSS as follows: <div style="background-color: green" tg-iphone-style="background-color: blue; margin:−2px"; />. Here, tg is a unique prefix to identify web asset modification specific syntax and iphone is a pre-defined group constant.

Custom groups: These are user-defined groups which are a combination of predefined group constants. For example, a user can target firefox browsers running on android 4.x by combining multiple categories:
<Group name="firefoxOnAndroid4x">
<Category name="browser" value="firefox"/>
<Category name="os" value="android 4x"/>

</Group>

This group is used in HTML as follows: <div style="background-color: green" tg-firefoxOnAndroid4x-style="background-color: blue; margin:−2px"; />

Figure 7:
FIG. 7 is a table illustrating an embodiment of groups.

FIG. 7 is a table illustrating an embodiment of groups. In the example shown, groups are used to target experiences and functionality to defined sets of users. The framework allows users to use pre-defined groups or define custom groups by picking attributes of the devices that would fall into that category. Categories 700 include browser, devicetype, os, screenwidth, dpi, format, and feature. Pre-defined groups 702 are as follows:

1) for browser: safari, chrome, native, firefox, skyfire—e.g., operamini, operamobile, bolt, openwave, obigo, telca, netfront, blazer, polaris, dolphin, ucweb, and silk;
2) for devicetype: phone {nontouchphone, touchphone}, iphone, ipod, desktop, tablet, ipad, ipadmini, fire, and surface;
3) for os: ios, android, blackberry, windows, bada, webos, and symbian;
4) for screenwidth: width[number] (e.g., width320);
5) for pixeldensity or dpi, dpiretina (e.g., 261 and above), dpimedium (e.g., 131-260), and dpilow (e.g., 130 and below);
6) for format: mp3, mp4, m4a, wmv, ogg, way, mpeg, mov, fly, webm, h264, png, gif, jpg, jpeg, and svg;
7) for feature: css3, nocss3, offlinestorage, noofflinestorage, gps, nogps, fileupload, nofileupload, flash, noflash, cookies, nocookies, camera, nocamera, multilingual, nomultilingual, webkit, nowebkit, jssupport {advancejssuport, basicjssupport}, nojssupport, html5, nohtml5, touch, and notouch.

In some embodiments, custom groups are defined in a group file and are common for all accessing the server. In some embodiments, custom groups are defined in a group file that is accessible or associated with a specific group of requestors or IP addresses.

In some embodiments, a custom group definition is of the form:
    <Group name="groupName">
        <Category name="browser" value="safari, firefox"/>
        <Category name="os" value="android2.2_ge"/>
        <Category name="devicetype" value="tablet"/>
        <Category name="screen" value="width320, width450_gt"/>
        <Category name="pixeldensity" value="dpiretina"/>
        <Category name="feature" value="gps, html5, camera"/>
        <Category name="format" value="mp3,mp4,jpg"/>
    </Group>

Note that values within each category separated by comma ',' are OR'ed, while the categories themselves are AND'ed to create the group. For example, the group chromeOnPhones below targets chrome browser AND the OS is either (ios or android) AND devicetype is phone:
    <Group name="chromeOnPhones">
        <Category name="browser" value="chrome"/>
        <Category name="os" value="ios,android"/>
        <Category name="devicetype" value="phone"/>
    </Group>

Values within each category separated by plus sign '+' are AND'ed. For example, the group myAndroid1 below targets android the OS AND has (both mp3 AND jpg) format support:
    <Group name="myAndroid1">
        <Category name="os" value="android"/>
        <Category name="format" value="mp3+jpg"/>
    </Group>

Custom groups also offer the power of combining AND and OR operations. For example, the group myAndroid2 below targets android OS AND has either (html5 OR (both css3 AND offlinestorage)) features:
    <Group name="myAndroid2">
        <Category name="os" value="android"/>
        <Category name="feature" value="html5,css3+offlinestorage"/>
    </Group>

In some embodiments, custom groups are able to use any category name and/or category value (e.g., in a list of pre-defined groups) in any combination as part of their definition.

In some embodiments, templates are used to invoke packaged modules within the system framework, which offer compatibility across a range of devices and easy integration of complex features that otherwise might require multiple compatibility and rendering checks. Templates are invoked using the syntax (starts with <tg-):
    <tg-templatename attribute1="v1" attribute2="v2" . . . >
The attributes & inner HTML of the template element depend on the template design. Consider a template—myphonenumber. The template filename should start with "tg-" followed by the templatename and ends with ".template"—for example, tg-myphonenumber.template. The template can be created just like an HTML page—HTML elements and styles should be specified with device specific display rules if needed.
    <html>
        <body>
            <div tg-iphone-$action="show">
                <a href="tel:${XPATH=tg-myphonenumber}" style="color:blue;">Click Me</a>
            </div>
            <div tg-iphone-$action="hide">
                <span style="color:green;">Please call ${XPATH=tg-myphonenumber}</span>
            </div>
        </body>
    </html>

In this example, the click to call link is to be shown for iPhones, while other devices see the phone number in plain text. XPATH expressions are used to obtain the content from the template invocation in the user's HTML code. XPATH syntax in template definitions starts with "${XPATH=" and ends with "}". The value should be the exact xpath expression from where the data is to be extracted. Note: The root node is tg-myphonenumber so the /html/body path ({XPATH=/html/body/tg-myphonenumber}) doesn't have to be specified. Usage of a template within HTML is as follows:
    <html>
        <body><tg-myphonenumber>1234567890</tg-myphonenumber></body>
    </html>

In this example, the inner HTML (e.g., 1234567890) of the tg-myphonenumber element is grabbed by the xpath expression specified on the template file. The final rendered html page when accessed from an iPhone device is as follows:
    <html>
        <body><div>
            <a href="tel:1234567890" style="color:blue">Click Me</a>
        </div></body>
    </html>

Figure 8:
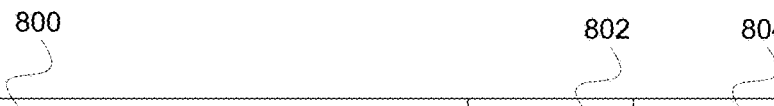
FIG. 8 is a table illustrating embodiments of operators.

The output for non-iPhone devices is as follows:
```
<html>
   <body><div>
      <span style="color: green">Please call
         1234567890</span>
   </div></body>
</html>
```
FIG. 8 is a table illustrating embodiments of operators. In the example shown in FIG. 8, operators supported within group definitions are shown. An operator is the last set of characters except in the event that there is range information provided with operate on both custom group definitions and on the attribute level. Operators 800 are shown with corresponding symbol 802 and example 804. For example, operator 'equal' (exact value) has no corresponding symbol, and an example of usage as 'ios4'. Also, operator 'greater than' has symbol '_gt', and an example of usage as 'ios4_gt'. Operator 'less than' has symbol '_lt', and an example of usage as 'ios4_lt'. Operator 'greater than or equal to' has symbol '_ge', and examples of usage as 'ios4_ge' or 'ios5.2_ge'. Operator 'less than or equal to' has symbol '_le', and an example of usage as 'ios4_le'. Operator 'not' has symbol '_not', and an example of usage as 'ios4_not'. Operator 'range' has symbol 'to', and an example of usage as 'ios4.1to4.8'. Operator 'series' (can be combined with other operators) has symbol 'x', and examples of usage as 'ios4x' or 'ios4xto5x' or 'io4x_not'. Operator 'or' has symbol ',', and an example of usage as 'ios,android,firefox,tablet'. Operator 'and' has symbol '+' and an example of usage as 'safari+touchphone+ios4x'.

Operators 800 are usable for custom group definitions and on the attribute level. In some embodiments, the comparison operands (e.g., greater than, less than, greater than or equal to, less than or equal to, and not) where appropriate—for example, with regard to OS versions (e.g., where greater corresponds to a later version, where lesser corresponds to an earlier version) and with regard to screen width (e.g., where greater corresponds to a larger screen size, and lesser corresponds to a smaller screen size)—for example, <img tg-ios4.1gt-$action="hide"/>, which indicates an operating system version of iOS greater than 4.1; or, <img tg-width320_le-$action="hide"/>, which indicates that a screen width is less than or equal to 320; but not, <img tg-safari gt-$action="hide"/>, because there is no such thing as greater than safari). In some embodiments, the operator 'not' is applicable to all categories (e.g., browser, os, format, dpi, screen, etc.)—for example, safari_not, android_not, ios3x_not, ios4.0_not, width320_not. In some embodiments, greater pixeldensity comprises a higher density and lesser pixeldensity comprises a lower density.

In some embodiments, a Groups file containing the custom group definitions for a given site is maintained at $TOMCATHOME/webapps/ROOT/WEB-INF/core/rules/groups.xml which is configurable via web.xml. A sample group file is as follows:
```
<GroupList>
   <Group name="mySafariIOS">
      <Category name="browser" value="safari"/>
      <Category name="os" value="ios"/>
   </Group>
   <Group name="myChromeAndroid">
      <Category name="browser" value="chrome"/>
      <Category name="os" value="android"/>
   </Group>
</GroupList>
```
In this example, two groups are defined: mySafariIOS which targets devices running iOS with safari browser, and myChromeAndroid which targets devices running android with chrome browser In some embodiments, server-side page redirection is done using the "tg-redirect" meta tag—for example, <meta name="tg-redirect" content="iphone='URL1'; android='URL2'"/>. Note the usage of single and double quotes inside the content field. In various embodiments, the redirection URL specified is an absolute link (http:// or www.) or a relative link (/). For example, <meta name="tg-redirect" content="iphone='www.domain.com/iphone'; android='www.domain.com/android'"/>.

In some embodiments, the file containing the device detection updates by useragent for a given site is maintained at $TOMCATHOME/webapps/ROOT/WEB-INF/core/rules/devicepatch.xml (configurable via web.xml). This file allows users to modify the characteristics of certain User Agents at a server level in order to provide enhanced flexibility within the framework. A sample patch file is as follows:
```
<DevicePatchList>
   <Device Useragent="ZTE-C88/1.0 SMIT-Browser/
      2.0.0" Screen="240"
   Format="jpg,jpeg,png,mp3"
   Feature="nocamera,noflash,nohtml5,notouch"
      Devicetype="phone"/>
</DevicePatchList>
```
In some embodiments, embedded instructions in a web asset are interpreted using a post-processor. The post-processor analyzes the web asset and determines if there are instructions to add to, to modify, or to remove elements of the web asset. In various embodiments, the web asset includes embedded instruction embedded in HTML, in CSS, in Javascript, or any other appropriate web asset instructions.

In some embodiments, an HTML embedded instruction includes the ability to overwrite an attribute or instruction, to show or hide instructions, to overwrite javascipt, or any other appropriate instruction. For example, rules to overwrite attributes or instructions are of the form: tg-groupname1,groupname2-attribute=value. Note that it is customary for an HTML attribute that starts with 'tg-'. In some embodiments, a rule which overwrites a green background color to blue for safari browser or touch-enabled devices is as follows: <div style="background-color: green" tg-safari,touch-style="background-color: blue; margin:-2px"; />. Note that multiple groups can be used separated by comma without any restrictions (e.g., groups can be custom groups, pre-defined groups, or a combination of custom and pre-defined groups). For example, rules to overwrite attributes are of the form: tg-groupname1,groupname2-$action=value, where the value is either 'hide' or 'show'. Note that it is customary for an HTML attribute that starts with 'tg-'. In some embodiments, a rule which overwrites a green background color to blue for safari browser or touch-enabled devices is as follows: <div style="background-color: green" tg-safari,touch-style="background-color: blue; margin:-2px"; />. For example, a 'div' (e.g., a division or section in an HTML document, a tag, etc.) which is only to be shown to devices that fall into mygroup1 or touch-enabled is represented as <div tg-mygroup1,touch-$action="show"/>. In some embodiments, rules to show and hide JavaScript snippets within the code are of the form: <script tg-groupname1,groupname2-$action=value/>, where value can be 'hide' or 'show'. For example, the snippet below will only be displayed on iPhone devices (e.g., devicetype=phone AND os=iOS):
```
<script tg-ios,phone-$action="show">
   alert("This is an iPhone!");
</script>
```

In some embodiments, a CSS embedded instruction includes the ability to overwrite an attribute or instruction, to restrict to certain groups, to manipulate tags, to hide or show tags, or any other appropriate instruction. For example, rules within the CSS code result in the CSS being selectively rendered according to the device requesting the page; CSS rules are similar to HTML rules and have a format of: tg-groupname1,groupname2-attribute:value. In the example below, the 'float: left' property will be overridden for devices from group g3.

```
#mydivId
{
  float: left;
  tg-g3-float:right;
}
```

In some embodiments, CSS rules are used to hide and show style tags. This is useful for limiting the CSS that is sent to a certain category of devices. For example, where the instructions below indicate that when the group is g1, then the instructions that font color is blue and font-size is 12px are hidden:

```
<style tg-g1-$action="hide" type="text/css">
  #id1
  {
    color: blue;
    font-size: 12px;
  }
</style>
```

In some embodiments, tags are used to invoke available packaged modules, which offer compatibility across a range of devices and easy plug-in of complex features that otherwise might require multiple compatibility and rendering checks. Tags are invoked using the following syntax (e.g., starting with '<tg-'):
    <tg-tagname attribute1="v1" attribute2="v2" . . . >
For example, a tag which adds appropriate click to call links on devices is as follows:
    <tg-phonenumber>40877777</tg-phonenumber>
In another example, the image gallery tag adds a custom image gallery that degrades the user experience based on the device accessing the page:
    <tg-imagegallery>
      <tg-option value="Url1">
      <tg-option value="Url2">
    </tg-imagegallery>

Figure 9:
FIG. 9 is a table illustrating an embodiment of a table of keywords.

FIG. 9 is a table illustrating an embodiment of a table of keywords. In the example shown, keywords 900 include '$', 'tg-', and '-' (hyphen as separator). Example 902 show example usages for keywords 900. For example, for '$action' examples include '$action="show"', '$action="hide"'. For example, for 'tg-' examples include: '<img tg-iphone-$action="hide"/> or '<tg-phonenumber>12345678</tg-phonenumber>'. For example, for '-' for a CSS attribute '-' is used as a separator:

```
Span{
  Float:left
  tg-g1-float:right
}
``` or as an element attribute:
    <img src='url' tg-g1-src="url2">

Figure 10A:
FIGS. 10A, 10B, and 10C are diagrams illustrating embodiments of web assets as displayed on devices.
Figure 10B:
Figure 10C:
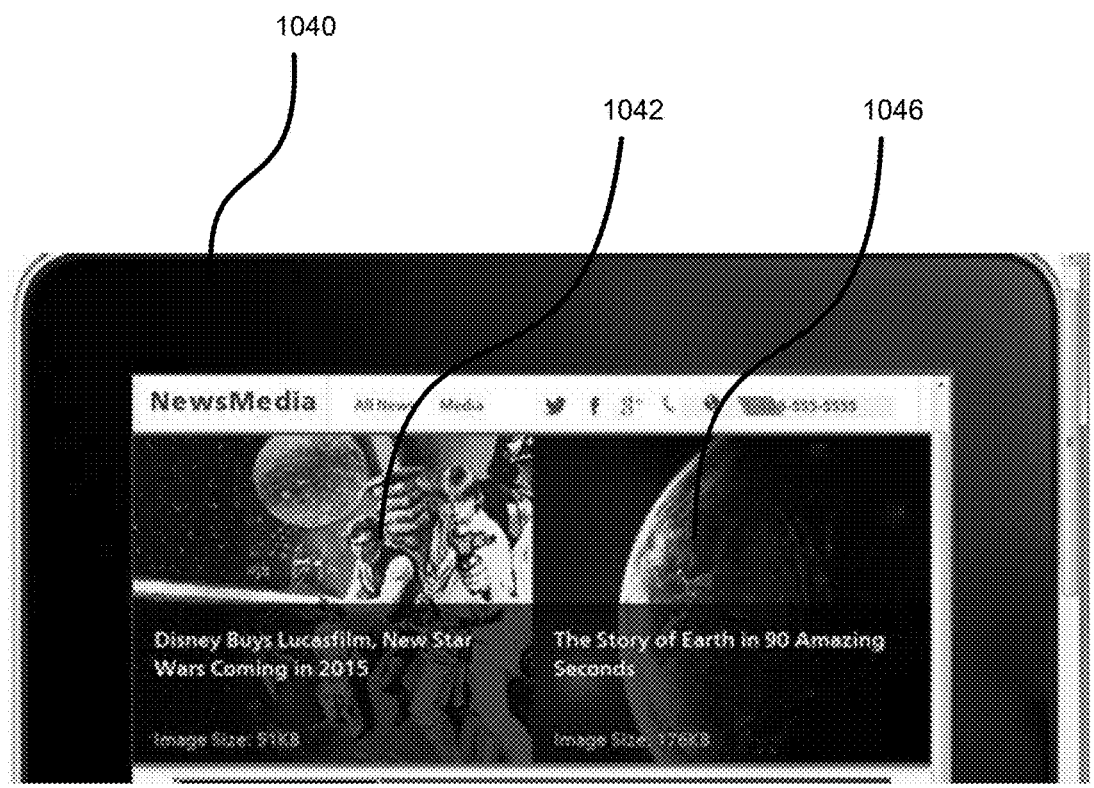

FIGS. 10A, 10B, and 10C are diagrams illustrating embodiments of web assets as displayed on devices. In the examples shown, web asset code for display of an image on devices is as follows:
    <div class="one" tg-ipad-$action="show" tg-iphone-$action="show" tg-android-$action="show">
    <a href="#">
    <h4>Image Size: 51 KB</h4>
    <span>Disney Buys Lucasfilm, New Star Wars Coming in 2015</span
    <img src="images/ipad/starwars.jpg" alt="Star Wars bought by Disney"/>
    </a></div>
    <div class="two" tg-ipad-$action="show" tg-iphone-$action="hide" tg-android-$action="hide">
    <a href="#">
    <h4>Image Size: 176 KB</h4>
    <span>The Story of Earth in 90 Amazing Seconds</span>
    <img src="images/ipad/earth.jpg" alt="Earth">
    </a></div>
Note that in FIG. 10A for android phone 1000 that image 1002 with caption "Disney Buys Lucasfilm, New Star Wars Coming in 2015" is shown. Similarly, in FIG. 10B for iphone 1020 the image 1022 with the same caption is shown and in FIG. 10C for ipad 1040 the image 1042 with the same caption is shown. However, only for ipad is image 1046 shown with caption "The Story of Earth in 90 Amazing Seconds". For the android phone and the iphone, image 1046 with its caption are hidden. Web asset code for showing different ads is as follows:
    <a href=" " class="iphone"><img tg-ipad-$action="hide" tg-iphone-$action="show" tg-android-$action="hide" src="ads/best buy iphone.png"/></a>
    <a href=" " class="android"><img tg-ipad-$action="hide" tg-iphone-$action="hide" tg-android-$action="show" src="ads/best_buy_android.png"/></a>
Note that in FIG. 10A for android phone, Best Buy advertisement 1004 is different from that in FIG. 10B for iphone with Best Buy advertisement 1024. In some embodiments, a post processor uses web asset modification code and hides or shows instructions as appropriate.

There are many alternative ways of implementing the invention. The disclosed embodiments are illustrative and not restrictive.

What is claimed is:

1. A system for web asset modification, comprising:
    a processor configured to:
      receive a request for a web asset for display on a device with a specific configuration;
      determine a set of groups associated with the request for the web asset based at least in part on the specific configuration of the device, wherein the set of groups comprises three or more of the following: a browser group, a devicetype group, an operating system group, a screenwidth group, a pixeldensity group, a format group, or a feature group;
      receive the web asset, wherein the received web asset comprises embedded customization instructions, wherein the embedded customization instructions comprise a name of a custom group;
      locate the embedded customization instructions of the web asset
      identify the name of the custom group;

retrieve a definition of the custom group from a custom group file based at least in part on the name of the custom group;

in response to a determination that the set of groups is included in the definition of the custom group, modify the web asset according to the embedded customization instructions to obtain a modified web asset, wherein modifying the web asset comprises one or more of HTML, CSS, or JavaScript of the web asset is modified to overwrite an attribute, show a JavaScript snippet, or hide the JavaScript snippet, wherein modifying the web asset changes the appearance of the web asset on the device when compared with the received web asset; and provide the modified web asset display on the device; and a memory coupled to the processor and configured to provide the processor with instructions.

2. A system as in claim 1, wherein the device comprises an electronic gadget with a web browser connected to an internet.

3. A system as in claim 1, wherein the web asset comprises a web page.

4. A system as in claim 1, wherein the web asset comprises one or more of the following: HTML instructions, CSS instructions, or JavaScript instructions.

5. A system as in claim 1, wherein the browser group comprises one or more of the following: safari, chrome, native, firefox, skyfire, operamini, operamobile, bolt, openwave, obigo, telca, netfront, blazer, polaris, dolphin, ucweb, or silk.

6. A system as in claim 1, wherein the devicetype group comprises one or more of the following: desktop, iphone, phone, nontouchphone, touchphone, tablet, ipad, ipadmini, fire, or surface.

7. A system as in claim 1, wherein the operating system group comprises one or more of the following: ios, android, blackberry, windows, bada, webos, or symbian.

8. A system as in claim 1, wherein the pixeldensity group comprises one or more of the following: dpiretina, dpimedium, or dpilow.

9. A system as in claim 1, wherein the format group comprises one or more of the following: mp3, mp4, m4a, wmv, ogg, wav, mpeg, mov, fly, webm, h264, png, gif, jpg, jpeg, or svg.

10. A system as in claim 1, wherein the feature group comprises one or more of the following: css3, nocss3, offlinestorage, noofflinestorage, gps, nogps, fileupload, nofileupload, flash, noflash, cookies, nocookies, camera, nocamera, multilingual, nomultilingual, webkit, nowebkit, jssupport, advancejssuport, basicjssupport, nojssupport, html5, nohtml5, touch, or notouch.

11. A system as in claim 1, wherein at least one group of the set of groups associated with the request for the web asset is defined using an operator.

12. A system as in claim 11, wherein the operator comprises one or more of the following:
equal,
greater than,
less than,
greater than or equal to,
less than or equal to,
not,
range,
series,
or,
or and.

13. A system as in claim 11, wherein the operator operates on operating system versions, wherein a greater operating system version comprises a later version and a lesser operating system version comprises an earlier version.

14. A system as in claim 11, wherein the operator operates on screen sizes, wherein a greater screen size comprises a larger screen size and a lesser screen size comprises a smaller screen size.

15. A system as in claim 11, wherein the operator operates on pixeldensity, wherein a greater pixeldensity comprises a higher density and a lesser pixeldensity comprises a lower density.

16. A system as in claim 1, wherein the embedded customization instructions comprise an overwriting instruction provided in the web asset.

17. A system as in claim 16, wherein the overwriting instruction includes overwriting a HTML attribute or a CSS attribute.

18. A system as in claim 16, wherein the overwriting instruction includes showing or hiding one or more instructions based at least in part on the set of groups associated with the request for the web asset.

19. A system as in claim 16, wherein the overwriting instruction includes picking a web assets.

20. A system as in claim 16, wherein the overwriting instruction preserves web asset functionality.

21. A system as in claim 1, wherein the web asset is received from a backend processor.

22. A system as in claim 1, wherein the processor comprises one of the following:
a proxy server processor, a web server processor, or an edge router processor.

23. A method of web asset modification, comprising:
receiving a request for a web asset for display on a device with a specific configuration; determining a set of groups associated with the request for the web asset based at least on the specific configuration of the device, wherein the set of groups comprises three or more of the following: a browser group, a devicetype group, an operating system group, a screenwidth group, a pixeldensity group, a format group, or a feature group;

receiving the web asset, wherein the received web asset comprises embedded customization instructions wherein the embedded customization instructions comprise a name of a custom group;

locating the embedded customization instructions of the web asset identifying the name of the custom group;

retrieving a definition of the custom group from a custom group file based at least in part on the name of the custom group;

in response to a determination that the set of groups is included in the definition of the custom group, modifying the web asset according to the embedded customization instructions to obtain a modified web asset, wherein modifying the web asset comprises one or more of HTML, CSS, or JavaScript of the web asset is modified to overwrite an attribute, show a JavaScript snippet, or hide the JavaScript snippet, wherein modifying the web asset changes the appearance of the web asset on the device when compared with the received web asset; and providing the modified web asset for display on the device.

24. A computer program product for web asset modification, the computer program product being embodied in a non-transitory computer readable storage medium and comprising computer instructions for:
  receiving a request for a web asset for display on a device with a specific configuration;
  determining a set of groups associated with the request for the web asset based at least on the specific configuration of the device, wherein the set of groups comprises three or more of the following: a browser group, a devicetype group, an operating system group, a screenwidth group, a pixeldensity group, a format group, or a feature group;
  receiving the web asset, wherein the received web asset comprises embedded customization instructions, wherein the embedded customization instructions comprise a name of a custom group;
  locating the embedded customization instructions in the web asset
  identifying the name of the custom group;
  retrieving a definition of the custom group from a custom group file based at least in part on the name of the custom group;
  in response to a determination that the set of groups is included in the definition of the custom group, modifying the web asset according to the embedded customization instructions to obtain a modified web asset, wherein modifying the web asset comprises one or more of HTML, CSS, or JavaScript of the web asset is modified to overwrite an attribute, show a JavaScript snippet, or hide the JavaScript snippet, wherein modifying the web asset changes the appearance of the web asset on the device when compared with the received web asset; and
  providing the modified web asset for display on the device.

25. The system of claim 1, wherein modifying the web asset comprises removing a web asset element.

26. The system of claim 1, wherein the processor is further configured to store the modified web asset.

27. The system of claim 1, wherein the request is a first request, the specific configuration is a first specific configuration, the device is a first device, the embedded customization instructions is a first embedded customization instructions, and the modified web asset is a first modified web asset, wherein the processor is further configured to:
  receive a second request for a second web asset for display on a second device with a second specific configuration;
  receive the second web asset;
  locate a second embedded customization instructions in the second web asset; modify the second web asset according to the second embedded customization instructions,
  wherein modifying the second web asset comprises one or more of HTML, CSS, or JavaScript of the second web asset is modified to overwrite an attribute, show a JavaScript snippet, or hide a JavaScript snippet; and
  provide the modified second web asset for display on the second device.

28. The system of claim 1, wherein the set of groups comprises five or more of the following: a browser group, a devicetype group, an operating system group, a screenwidth group, a pixeldensity group, a format group, or a feature group.

29. The system of claim 1, wherein the set of groups comprises seven or more of the following: a browser group, a devicetype group, an operating system group, a screenwidth group, a pixeldensity group, a format group, or a feature group.

* * * * *